UNITED STATES PATENT OFFICE 2,412,599

ABRASIVE ARTICLE AND METHOD OF MANUFACTURING THE SAME

Halsey W. Buell, Niagara Falls, N. Y., assignor to The Carborundum Company, Niagara Falls, N. Y., a corporation of Delaware No Drawing. Application January 31, 1944, Serial No. 520,549

13 Claims. (Cl. 51—298)

This invention relates to improved abrasive articles and to adhesives for use in the manufacture thereof. The invention is particularly concerned with the improvement of adhesives consisting essentially of a urea-aldehyde resin such as a urea-formaldehyde resin.

This application is a continuation-in-part of my copending application Serial No. 472,989, filed January 20, 1943.

The usual bond for making coated abrasive articles is glue. Recently such articles have been made in which the binder for attaching the grains to a backing is a phenol-aldehyde condensation product of the type commonly known as "Bakelite." The glue bond sandpaper is useful for a great many purposes but softens somewhat under conditions of severe use, with the result that the glue becomes slightly sticky and picks up the detritus, the result being what is characterized as "loading." Loading reduces the abrasive efficiency of the product because the clearance spaces or interstices between the grains become filled with the detritus and the effective sharpness of the product is thereby reduced. Abrasives in which the phenol-aldehyde condensation products are used as the bond are more efficient than those bonded with glue because the bond does not soften when heated and there is consequently much less loading with this type of article. However, the phenol-aldehyde resins are relatively costly and they require a comparatively long heat treatment and relatively high temperatures for curing. Abrasive products employing them are therefore considerably more expensive than is the case when the bond is glue.

It is well known that urea and numerous related compounds such as thiourea, melamine, guanadine, and cyanamid can be condensed with aldehydes such as formaldehyde to form syrupy liquids which are soluble in water at the early stages which can be caused to react by the use of catalysts or heat or both to form solid resinous products which are infusible and insoluble in most solvents. Urea and such related compounds have the common characteristic that they contain at least one carbon atom bonded to two nitrogen atoms, at least one of the nitrogens being an amino-nitrogen. These resins have many desirable properties which fit them for use as adhesives but many of them have the very serious objection that they are not stable to changes in atmospheric conditions to which films of adhesive are exposed. When such products are formed into films which are to be directly exposed to the atmosphere, as is the case in the manufacture of coated abrasives of the type commonly referred to as "sandpaper," they crack and check and tend to become quite friable and to lose their adhesiveness. Furthermore, such films, even when first made, are not tough but possess what has been very aptly described as "eggshell brittleness." The resinous products are therefore not very satisfactory for use as adhesives for these reasons, although for other reasons it would be highly desirable to employ them. For example, many of these resins are comparatively inexpensive and, in addition, they have the property of curing to their final infusible form at comparatively low temperatures and in relatively short times.

It has been observed that when small moldings are made of a urea resin and abrasive grain, the articles check and crack and tend to disintegrate within a very few days. There appear to be internal strains in such articles which further increase the deficiency due to the inherent eggshell brittleness. This tendency to check and crack also appears in the coated abrasive articles and is probably, to some extent at least, responsible for the relatively poor efficiency of such articles.

I have also observed that when coated abrasives in which the bond is a urea-aldehyde resin are exposed to variations of temperature and humidity the resin bond tends to become weak and friable and to lose its adhesiveness to the backing on which the abrasive layer is coated.

It is accordingly an object of the present invention to improve the toughness and the resistance to change in atmospheric conditions of the urea-type resins. Another object of the invention is to increase the stability of such resins, and particularly of urea-formaldehyde resins. Still another object of the invention is to provide a urea-type resin which will have the necessary toughness and stability to changes in atmospheric conditions to make it suitable for use as an adhesive in the manufacture of coated abrasives. Other objects of the invention are the provision of a modifying agent for urea-type resins which will increase the toughness and stability of such resins, and methods of making the same. Still another object of the invention is the provision of an improved abrasive article and a method of manufacture thereof.

I have found that the deficiencies of the urea-type resins which I have described above may be very largely overcome by incorporating in the resins a filling material or modifying agent in the form of a finely divided or pulverized vegetable material such as flours derived by pulverizing various cuto-cellulose materials such as nut shells and fruit stones or pits. I have also found that still additional improvement can be made by subjecting the shell or pit flours to one or more of various treatments which modify the chemical and physical characteristics of the flours and make them highly satisfactory for use as modifiers for the urea-type resins.

Among the cuto-cellulose materials which I may use in my invention are flours obtained by grinding walnut shells, specifically, the shell of the English walnut, almond shells, pecan shells, coconut shells, peach pits, apricot pits, and plum pits. Generally speaking materials falling in the general classification of nut shells and fruit pits have a dense granular structure as distinguished from a fibrous structure such as is found in wood flour, and it is with this type of material that my invention is particularly concerned.

One material which has been found to be highly satisfactory and which is commercially available is the flour made by grinding the ordinary English walnut shells. These flours, when first made, are a light brown or tan color but upon standing for prolonged periods of time or if made from shells which have been exposed to the atmosphere or aged for prolonged periods are somewhat darker in color, indicating some sort of chemical change in the flour. Generally speaking, I have found the darker flours to be more satisfactory than the light ones.

Although I have made satisfactory adhesives by modifying urea-type resins with ordinary walnut shell flour as it is obtained from the manufacturers, I prefer to use a flour which has been treated to modify its physical and chemical character since such treated flours appear to improve the stability of adhesive films of the urea-type resins more than the freshly ground or untreated flours.

One treatment which I have found to be very effective for improving the characteristics of the vegetable flours of my invention consists in subjecting the pulverized materials to the action of dry steam under pressure. A very convenient method of performing such treatment is to place the flour in an autoclave. For example, the flour may be distributed in a suitable pan, preferably in a layer not more than 2 to 3 inches deep, and the pan with its contents can be put inside a pressure chamber to which live steam is introduced. The treatment is preferably prolonged for a matter of 2 to 3 hours and I have found that a steam pressure of 100 pounds per square inch gauge brings about the desired change in character and properties although improvement is found with pressures as low as 50 pounds per square inch gauge. Generally speaking, I prefer not to use pressures much higher than about 125 pounds per square inch since I have found that such high pressures tend to char the flour and somewhat reduce its effectiveness as a modifier for the urea-type resins.

The autoclaving treatment of the flour material not only changes the physical appearance of the flour but also changes the chemical characteristics in a number of respects. For example, if 5 grams of flour are stirred with and suspended in 50 cc. of water and the acidity of the resulting suspension is measured as by the use of a Coleman pH meter, it is found that the steam-digested or autoclaved flours have a lower pH than is found in the untreated flours.

Similarly, the total acidity of the treated flours is higher than that of the untreated flour. Total acidity is determined by the official method No. XXVI, 24, adopted by the Association of Official Agricultural Chemists as described on page 341 of the book entitled "Official and Tentative Methods of Analysis of the Association of Official Agricultural Chemists," 5th edition, published 1940 by the Association of Official Agricultural Chemists, Washington, D. C. The determination is made by suspending 5 grams of the flour in 50 cc. of distilled water, stirring the suspension intermittently for a period of 30 minutes, and then titrating with 0.1N NaOH to a pH of 7. The total acidity as used in the specification and claims is the number of cubic centimeters of the 0.1N NaOH required to bring to neutrality 100 grams of the flour. It is therefore calculated by multiplying the number of cubic centimeters used in the titration of the suspension of 5 grams of the flour by 20.

It is also found that the amount of water solubles present in the treated flours is greater than is found in untreated flour. Water solubles are determined by extracting with hot water a weighed sample of the flour which has been dried for about 6 hours at about 105° C., filtering, washing, drying and weighing the insoluble products remaining on the filter.

Still another property which is changed by the autoclaving treatment is the amount of material soluble in hot alkali. This determination is made by boiling a weighed, dried sample of the flour in 1% NaOH while stirring occasionally, filtering off, washing, drying and weighing the insoluble material.

The following table illustrates the changes in the properties of walnut shell flour and almond shell flour occasioned by the autoclaving treatment indicated in terms of pounds of steam pressure.

| Material | Per cent water solubles | Total acidity | pH | Alkali solubles |
| --- | --- | --- | --- | --- |
| C200 walnut shell flour | 1.5 | 70 | 4.6 | 18.5 |
| Steam treated (50 lb.) walnut shell flour | 2.7 | 116 | 4.2 | 23.6 |
| Steam treated (75 lb.) walnut shell flour | 11.6 | 280 | 3.7 | 26.0 |
| Steam treated (100 lb.) walnut shell flour | 9.0 | 420 | 3.7 | 33.9 |
| C200 almond shell flour | 10.5 | 164 | 4.6 | 14.7 |
| Steam treated (50 lb.) almond shell flour | 13.2 | 340 | 4.6 | 14.4 |
| Steam treated (75 lb.) almond shell flour | 16.3 | 468 | 4.4 | 16.3 |
| Steam treated (100 lb.) almond shell flour | 14.0 | 526 | 4.2 | 22.6 |

The flours of my invention are further distinguished from products which have been used as fillers for molding purposes, such as wood flour, by being comparatively non-absorbent and granular in structure rather than fibrous. Furthermore, these fillers are all decidedly denser than the wood flours of the prior art, as is indicated in the following table of bulk densities of walnut and almond shell flours, both untreated and autoclaved under various pressures as shown in the table. The bulk density of hardwood flour of a type used as a filler for making molded articles is also given for purposes of comparison.

| Material | Treatment | | | |
| --- | --- | --- | --- | --- |
|  | None | 50 lb. | 75 lb. | 100 lb. |
| Walnut shell flour | 0.73 | 0.65 | 0.64 | 0.62 |
| Almond shell flour | 0.54 |  | 0.49 | 0.55 |
| Hardwood flour | 0.35 |  |  | 0.29 |

Another distinguishing feature of the fillers of my invention is the relative amount of lignin which is greater than that of wood flours. For example, walnut shell flour contains about 30% lignin as compared to about 25% in maple wood flour. The shell and pit flours are also characterized by the presence of substantial amounts of cutin which is a waxy material not present in any of the woods.

Another property which is characteristic of the treated flours and is not found in ordinary wood flour is the peculiar behavior of my fillers when they are treated with ammonia water. When the treated fillers are soaked in ordinary commercial ammonia water the flour darkens and a material is extracted which is also quite dark in color.

Another treatment suitable for my purpose consists of digesting the vegetable flour for about one hour at 140° F. with 45% sulphuric acid. The flour is also somewhat improved by the addition of powdered lignin material, such as lignin sulphonate, as for example that sold by the Marathon Chemical Company, Rochschild, Wisconsin, as "Grade C Marathon Extract."

When the urea-type resins are allowed to stand for prolonged periods of time at ordinary temperatures they gradually advance and become much thicker and eventually completely solidify. The thickened liquids can be made of suitable viscosity for coating by diluting with water but I have found that such diluted resins are not so satisfactory from the standpoint of their coating properties as are the freshly made liquids which are of the same viscosity without adding water. When the more advanced resins are thinned with water the fillers are inclined to separate out during the coating operation and leave a film which is not uniform in thickness but is characterized by streaks where the filler is present in greater proportion and other streaks where there is substantially no filler. This difficulty is reduced by the use of treated fillers such as those which have been treated in accordance with Examples I, II, and III. It is also found particularly with the melamine-formaldehyde resins which seem to be even more affected by the condition of the filler than are the urea-formaldehyde resins. For this reason I prefer to use a resin which, without dilution by water, has a viscosity in the range of about 500 to 1000 centipoises. In claiming my invention I have used the term "normal viscosity" to indicate the viscosity of the resin as it is prepared as distinguished from viscosity obtainable by dilution with water.

I have also observed that the change in viscosity brought about by the addition of the fillers of my invention is less when fillers are used which have been treated at higher pressures than is the case with untreated flours or those which have been treated at lower pressures. The following table, showing the viscosity of a suspension of 20 grams of the flour in 100 grams of the liquid urea-formaldehyde resin, illustrates this feature:

| Material | Viscosity, centipoises |
| --- | --- |
| No filler | 800 |
| Untreated walnut shell flour | 2,500 |
| 50-pound autoclaved walnut shell flour | 1,900 |
| 75-pound autoclaved walnut shell flour | 1,680 |
| 100-pound autoclaved walnut shell flour | 1,510 |

In order to cure the urea-type resins it is customary to add a catalyst such as an acid or a salt which has an acid reaction such as ammonium chloride or ammonium sulphate. This is necessary in order to advance the resin to the infusible insoluble condition under conditions of temperature and time which are practical. One of the advantages of my modifying agents comes from the fact that they have an acid reaction and usually do not require the addition of any catalyst. In other words, the vegetable flours of my invention perform the dual function of acting as catalysts to bring about the desired curing of the resin and as modifying agents to prevent the resins from cracking and checking and from being affected by changes in atmospheric conditions. This function is performed best by fillers which have been treated, as by the autoclaving treatment which I have described. However, where the total acidity of the fillers is comparatively low, as is the case with the untreated fillers, it is possible and desirable to promote the curing by the addition of minor amounts of catalyst. If the pH of the resin with the modifier or catalyst added is too low or if the amount of free acid is too great the resins are unstable and are likely to solidify before they can be used. Furthermore, such highly acid resins are much more likely to crack and check than are resins which are cured for longer times or at lower temperatures in the presence of lower acidity. Where a walnut shell flour which has been autoclaved for 2 hours at 100 pounds steam pressure gauge is used in the proportion of 20 parts of the flour to 100 parts of the liquid resin the acidity is satisfactory and it is not necessary to add additional acid catalyst. On the other hand, where a flour is used which has been treated at 50 pounds steam pressure and, correspondingly, has a total acidity of 100, it is desirable to add sufficient acid catalyst to raise the total acidity to about 300–400.

I have further found that where a hardener is added it is desirable to employ one which contains ammonia, possibly because of the effect of the ammonia on the filler. One particular material which has been found to be satisfactory is an ammoniacal solution of ammonium sulfate. While there are other materials such as sulfamic acid and certain organic phosphates which will catalyze the curing of the resin, it has been my experience that the full improvement from the filler-modified resins is not obtained unless the catalyst is one which contains ammonia, such as the ammonia solution of ammonium sulfate.

I have also found it to be desirable at times to employ a so-called "plasticizer" which acts as a toughening agent for the urea resin, particularly where the filler is either not used at all or is added in small amounts. The toughening agents or plasticizers commonly used are alkyd resins, and where the water-soluble resins are used it is desirable to employ such resins which are soluble in water or aqueous ammonia solutions. A typical plasticizer or toughening agent is sorbitol phthalate, which is the alkyd formed by condensing sorbitol with phthalic anhydride.

The invention will be illustrated with respect to adhesives made by modifying a urea-formaldehyde resin and a melamine-aldehyde resin, but it is to be understood that the examples herein given are for illustrative purposes only and are not limitative since the invention is applicable to other urea-type resins such as those hereinbefore mentioned.

Example I

A urea-formaldehyde resin suitable for use in my invention may be prepared as follows:

100 parts commercial urea $CO(NH_2)_2$ is mixed with 270 parts of a commercial formaldehyde solution containing about 40% formaldehyde and the mixture is brought to a boil. The pH of the mixture is adjusted to about 6 by the addition of formic acid and is refluxed for about 2 hours or until a sample gives a clear syrup upon cooling rapidly to about 20° C. The syrup thus obtained is neutralized with caustic soda to a pH of approximately 7 and the viscosity and solids content can be adjusted by evaporation of some of the water, preferably under a vacuum. Generally speaking, I have found that such resins which have a solids content of about 60 to 70% and a viscosity of 500–1000 centipoises are satisfactory for many purposes, such as for use as an adhesive or binder in the manufacture of coated abrasive articles.

Example II

A melamine-formaldehyde resin was prepared by a method similar to that described in Example I except that 120 parts of melamine were used instead of the 100 parts urea of the example.

Example III

A mixed melamine-urea-formaldehyde resin was prepared by reacting, in a manner similar to that described in Example I, a mixture of 40 parts urea, 85 parts melamine, and 270 parts formaldehyde.

Example IV

A quantity of walnut shell flour obtained from the Agicide Laboratories of Milwaukee, Wisconsin, and sold under the grading "C200," which is a flour obtained by grinding ordinary English walnut shells and screening through a 200 mesh screen, was put into a steel pan in a layer approximately 3 inches deep. The pan with its contents was placed in an autoclave and subjected to the action of dry steam under 100 pounds pressure for 2 hours, care being taken to see that no condensate dropped directly into the flour. At the end of the treatment the material was removed from the autoclave and was found to be slightly caked together. It was broken up by passing through an 80 mesh screen.

Example V

Almond shell flour was treated as described in the preceding example except that the steam pressure was kept at 75 pounds per square inch gauge instead of the 100 pounds of the preceding example.

Example VI

Apricot pits were broken up, the seeds were separated from the hard outer shells, and the shells were pulverized to a fine flour. This flour was autoclaved at 50 pounds per square inch gauge for 3 hours and then screened through an 80 mesh screen.

Example VII

A disc of the type described and claimed in U. S. Patent Re. 20,946 was made by combining vulcanized fiber with a heavy grade of cloth used in the abrasive industry in making such discs known as "2.58 Brown X Drills." The vulcanized fiber was .010 inch thick and known as "Spaulding Armite fiber." The cloth was first treated by presizing both sides with a mixture consisting of 100 parts of a urea-aldehyde condensation product known as "Bakelite XRU–13108" with 10 parts of a hardener sold as "Bakelite XK–15256," 20 parts of plasticizer "Bakelite XR–15300," and 40 parts water. The resin is an aqueous suspension of a urea-formaldehyde condensation product containing 60% solids and having a normal viscosity of 900 centipoises. The hardener is sulfamic acid. The plasticizer or toughening agent is an aqueous solution of reaction product of triethanolamine and maleic anhydride containing 70% solids. The mix was prepared by agitating the three constituents together for about 15 minutes at ordinary temperature. A total of 20 lbs. of the presizing liquid per sandpaper maker's ream of 480 sheets 9" x 11" was added to the cloth and the cloth was dried for 1½ hours at 125° F.

The cloth was then combined with a fiber by coating the fiber with 7 lbs. per ream of a mixture identical with that used for presizing the cloth except that no additional water was used.

The cloth side of the combination backing was then coated with abrasive grains, employing as the bond for the grains a mixture containing 100 lbs. of the resin "XRU–13108," and 20 parts of 200 mesh walnut shell flour which had been autoclaved for 2 hours under a pressure of 100 lbs. per square inch gauge. The mix was prepared by stirring the walnut shell flour into the liquid resin and agitating for 15 or 20 minutes to get the walnut shell flour thoroughly dispersed through the liquid.

The making coat was applied in the proportion of 20 lbs. per ream and 24 grit abrasive grain was added in the proportion of 95 lbs. per ream. The coated material was dried for one hour and was then sized with the same mixture as was used for the making coat, the weight of size being 17 lbs. per ream. The product was dried for 8 hours at 100° F. and was then cured for 2 hours at 125° F., 2 hours at 150° F., 2 hours at 175° F., 2 hours at 200° F., and 2 hours at 225°. The product thus obtained was cut into discs 9⅛ inches in diameter and the discs were found to be much better than the ordinary glue bond discs.

Example VIII

Abrasive paper especially suited for woodworking was prepared by coating a backing consisting of 130-pound cylinder paper with a making coat identical with that of Example VII except that 15 parts of almond shell flour autoclaved for 2 hours at 75 lbs. per square inch gauge was substituted for the walnut shell flour and the mixture was diluted by the addition of 20 parts of water. The making coat was applied in the proportion of 7½ lbs. per ream and 100 grit abrasive grains in the amount of 17½ lbs. per ream were applied to the liquid coating. The making coat was dried at room temperature for approximately 30 minutes and the product was then sized with the same material as was used for the make except that it was further thinned by adding water in the proportion of 20 parts water to 100 lbs. of the making mix. The sizing coat was in the proportion of 5½ lbs. per ream of the sizing solution. The product was then dried for 4 hours at 110° F. followed by curing 2 hours each at 125° F., 150° F., 175° F., 200° F., and 225° F. This product was found to be superior to glue bonded material.

Example IX

Metal cloth was prepared by coating Brown X Drills which had been filled with glue and starch, with a making coat of high grade hide glue solution containing approximately 50% solids in the proportion of 15 lbs. of the solution per ream and with 40 grit fused alumina grain in the proportion of 50 lbs. per ream. The making coat was dried at room temperature for about twelve to fifteen minutes and the product was then sized with the same mixture as was used for the making coat of the disc material described in Example VII in the proportion of 20 lbs. per ream of the liquid coating material. The product was dried 4 hours at 110° F. and was then cured the same as the material of Example VIII except that the baking at 225° F. was continued for 4 hours. This material, when used for grinding metal, was found to be at least 35%, and even as much as 100%, more effective than glue bond material.

Although I have illustrated the invention by examples showing the use of 15–20 parts of a 200 mesh walnut shell flour to 60 parts of resin solids I have found that other proportions and sizes of the powdered material may be successfully employed. Generally speaking, I prefer to use fillers which are quite finely ground in order to get the material uniformly distributed through the bond as much as possible.

Instead of combining the cloth to the fiber with a urea resin, in making discs, I have also employed backings in which the cloth was stuck to the fiber with glue in the manner used in making glue bond discs of the prior art. Furthermore, as illustrated by Example IX, I have found that the urea resin-filler combination of my invention makes a material improvement when applied to articles in which the grain is first stuck to the backing with a glue making coat. The urea resins are much more heat resistant than glue, and by employing them for sizing, the glue is covered up by the heat resistant material and consequently the articles do not load as is the case where glue is employed alone.

The proportion of filler in the liquid adhesive may be varied but generally speaking, I have found it desirable to use from about 5 to 25, and preferably around 10 to 20 parts by weight of the filler for each 100 parts by weight of the liquid resin, depending upon the purpose for which the adhesive is intended. For example, it is well known that the viscosity of the liquid adhesive used in making coated abrasives should be different for the different grits, the more viscous adhesives being employed where the coarser grits are used. Since the addition of the filler affects the viscosity of the liquid adhesive, I usually employ less filler for the finer grits than for the coarser ones.

As has been indicated, the total acidity of the filler, either as obtained by the treatment or in part by treatment and in part by the addition of acid, is preferably in the neighborhood of 300–400. However, satisfactory results for many purposes are obtained when the total acidity is as low as about 240 or as high as about 500.

While I have illustrated my invention by describing the use of my adhesives in the manufacture of coated abrasives, it is to be understood that the adhesives are suitable for many other purposes such as for the manufacture of laminated products and for the application of protective films. Likewise, while I have illustrated the invention by examples in which urea formaldehyde and melamine formaldehyde resins are employed, as I have indicated, the invention is also applicable to other urea-type resins. Furthermore, mixtures of resins may be used and other modifying agents such as inorganic fillers may be added in accordance with prior practices.

As was illustrated in one of the examples, in the manufacture of coated abrasive products one type of adhesive may be employed as the so-called "making coat" for first attaching the abrasive grains to the backing while another kind of adhesive may be used for the second or so-called "sizing coat" which is applied over the abrasive grains, the filler-modified urea-type resins being either or both of these coats. As indicated, one very satisfactory combination is the use of a hide glue adhesive for the making coat and the filler-modified urea-formaldehyde resin as the sizing coat.

While I have illustrated my invention by reference to a number of specific examples it is to be understood that the invention is not limited by such examples nor by the data included herein but rather is to be considered to be of the scope set forth in the following claims.

I claim:
1. A liquid adhesive comprising a suspension of about 5–25 parts of a dense granular cuto-cellulosic flour having a total acidity in the range of about 240 to 500 in about 100 parts of a water-soluble urea-formaldehyde condensation product having a normal viscosity in the range of about 500 to about 1000 centipoises and a solids content of about 60–70%, said flour having a bulk density greater than about 0.5.

2. A coated article having a surface film which is substantially free from cracks and checks and is stable to changes in atmospheric conditions, said film comprising the heat-hardened reaction product of a mixture comprising a dense granular cuto-cellulosic flour and a water-soluble reaction product of formaldehyde and a compound containing at least one carbon atom bonded to two nitrogen atoms, at least one of which is present as part of an amino group $NH_2$, said flour having a bulk density greater than about 0.5, a total acidity greater than about 240, and a pH in the range of about 3.5–4.4, said reaction product being heat-convertible to form an insoluble, infusible resin.

3. A coated article having a surface film which is substantially free from cracks and checks and is stable to changes in atmospheric conditions, said film comprising the heat-hardened reaction product of a mixture comprising about 5–25 parts of a dense granular cuto-cellulosic flour and about 60 parts of a water-soluble reaction product of urea and formaldehyde, said flour having a bulk density greater than about 0.5, a total acidity greater than about 240, and a pH in the range of about 3.5–4.4.

4. A liquid adhesive capable of forming surface films which are substantially free from cracks and checks and are stable to changes in atmospheric conditions, said adhesive comprising a mixture of a dense granular cuto-cellulosic flour and an aqueous suspension of a heat-hardenable reaction product of formaldehyde and a compound containing at least one carbon atom bonded to two nitrogen atoms, at least one of which is present as part of an amino group $NH_2$, said flour having a bulk density greater than about 0.5 and a total acidity in the range of about 240 to about 500, said reaction product being heat-convertible to form an insoluble, infusible resin.

5. A liquid adhesive capable of forming surface films which are substantially free from cracks and checks and are stable to changes in atmospheric conditions, said adhesive comprising a mixture of a dense granular cuto-cellulosic flour and an aqueous suspension of a heat-hardenable reaction product of urea and formaldehyde, said flour having a bulk density greater than about 0.5 and a total acidity in the range of about 240 to about 500.

6. In a method of making a heat-hardenable resinous adhesive which will cure to a surface film which is substantially free from cracks and checks and is stable to changes in atmospheric conditions, the steps which comprise subjecting a granular cuto-cellulosic flour having a bulk density greater than about 0.5 to a steam pressure of about 50–125 pounds per square inch gauge for about 2–3 hours, and mixing the thus treated flour with a liquid heat-hardenable reaction product of urea and formaldehyde.

7. In a method of making a heat-hardenable resinous adhesive which will cure to a surface film which is substantially free from cracks and checks and is stable to changes in atmospheric conditions, the step which comprises mixing a granular cuto-cellulosic flour having a bulk density greater than 0.5 and a total acidity greater than about 240 with a water suspension of a heat-hardenable reaction product of formaldehyde with a compound containing at least one carbon atom bonded to two nitrogen atoms, at least one of which is present as part of an amino group NH₂, said reaction product being heat-convertible to form an insoluble, infusible resin.

8. A coated abrasive article comprising a backing having a layer of abrasive grains attached to a surface thereof by a bond comprising the heat-hardened reaction product of a mixture comprising a water-soluble urea-formaldehyde condensation product and a dense granular cuto-cellulosic flour having the bulk density, total acidity, pH and other properties and characteristics of such a flour which has been exposed for 2 to 3 hours to the action of saturated steam under a pressure of about 50–125 pounds per square inch gauge.

9. A coated abrasive article comprising a backing having a layer of abrasive grains attached to a surface thereof by a bond comprising the heat-hardened reaction product of a mixture comprising a water-soluble urea-formaldehyde condensation product and walnut shell flour having the bulk density, total acidity, pH and other properties and characteristics of such a flour which has been exposed for 2 to 3 hours to the action of saturated steam under a pressure of about 75–125 pounds per square inch gauge.

10. A coated abrasive article comprising a backing having a layer of abrasive grains attached to a surface thereof by a bond comprising the heat-hardened reaction product of a mixture comprising a water-soluble urea-formaldehyde condensation product and almond shell flour having the bulk density, total acidity, pH and other properties and characteristics of such a flour which has been exposed for 2 to 3 hours to the action of saturated steam under a pressure of about 50–100 pounds per square inch gauge.

11. A coated abrasive article comprising a backing having a layer of abrasive grains attached to a surface thereof by a bond comprising the heat-hardened reaction product of a mixture comprising a water-soluble urea-formaldehyde condensation product and apricot pit flour having the bulk density, total acidity, pH and other properties and characteristics of such a flour which has been exposed for 2 to 3 hours to the action of saturated steam under a pressure of about 50–125 pounds per square inch gauge.

12. A coated abrasive article comprising a backing having a layer of abrasive grains attached to a surface thereof by a bond comprising the heat-hardened reaction product of a mixture comprising a water-soluble heat-hardenable reaction product of formaldehyde and a compound containing at least one carbon atom bonded to two nitrogen atoms, at least one of which is an amino nitrogen, with a dense granular cuto-cellulosic flour having the properties and characteristics obtainable by exposing the flour to the action of saturated steam under a pressure of about 50–125 pounds per square inch gauge for a period of 2 to 3 hours.

13. A coated abrasive article comprising a backing having a layer of abrasive grains attached to a surface thereof by a bond comprising the heat-hardened reaction product of a mixture comprising a water-soluble heat-hardenable reaction product of formaldehyde and a compound containing at least one carbon atom bonded to two nitrogen atoms, at least one of which is an amino nitrogen, with walnut shell flour having the properties and characteristics obtainable by exposing the flour to the action of saturated steam under a pressure of about 50–125 pounds per square inch gauge for a period of 2 to 3 hours.

HALSEY W. BUELL.

Certificate of Correction

Patent No. 2,412,599. December 17, 1946.

HALSEY W. BUELL

It is hereby certified that error appears in the printed specification of the above numbered patent requiring correction as follows: Column 11, line 26, after "than" insert *about*; and that the said Letters Patent should be read with this correction therein that the same may conform to the record of the case in the Patent Office.

Signed and sealed this 25th day of February, A. D. 1947.

[SEAL]

LESLIE FRAZER,
*First Assistant Commissioner of Patents.*